United States Patent
Fang

(10) Patent No.: US 8,204,219 B2
(45) Date of Patent: Jun. 19, 2012

(54) CRYPTOGRAPHIC METHOD AND APPARATUS FOR ENHANCING COMPUTATION PERFORMANCE OF A CENTRAL PROCESSING UNIT

(75) Inventor: Chun-Wei Fang, Taipei (CN)

(73) Assignee: Panasonic Corporation, Osaka (JP)

( * ) Notice: Subject to any disclaimer, the term of this patent is extended or adjusted under 35 U.S.C. 154(b) by 807 days.

(21) Appl. No.: 12/376,339

(22) PCT Filed: Oct. 26, 2007

(86) PCT No.: PCT/JP2007/071357
§ 371 (c)(1),
(2), (4) Date: Feb. 4, 2009

(87) PCT Pub. No.: WO2008/053980
PCT Pub. Date: May 8, 2008

(65) Prior Publication Data
US 2010/0228992 A1    Sep. 9, 2010

(30) Foreign Application Priority Data
Oct. 27, 2006   (CN) .......................... 2006 1 0142830

(51) Int. Cl.
*G06F 21/00* (2006.01)
(52) U.S. Cl. ................ 380/29; 380/28; 380/30
(58) Field of Classification Search ............ 380/28, 380/29, 30
See application file for complete search history.

(56) References Cited

U.S. PATENT DOCUMENTS
6,031,911 A * 2/2000 Adams et al. .................. 380/29
(Continued)

FOREIGN PATENT DOCUMENTS
JP          1-9561      1/1989
JP       2000-81841     3/2000

OTHER PUBLICATIONS

NIST (National Institute of Standards and Technology): "FIPS Pub 46-3 : Data Encryption Standard (DES)", Internet Citation, [Online] retrieved from URL:http://csrc.nist.gov/publications/fips/fips46-3/fips46-3.pdf Oct. 25, 1999, pp. 1-25.

(Continued)

*Primary Examiner* — Jason Gee
(74) *Attorney, Agent, or Firm* — Greenblum & Bernstein, P.L.C.

(57) ABSTRACT

A cryptographic method for enhancing computation performance of a central processing unit involves the execution of a conversion function of the cryptographic method by the central processing unit. The conversion function computation requires the use of a plurality of substitution boxes. The method comprises the steps of: (A) detecting a processing bit length of the central processing unit; (B) generating at least one new substitution box from original substitution boxes according to the processing bit length and a bit permutation sequence, each of the at least one new substitution box containing a plurality of new substitution values whose bit length is equal to the processing bit length; and (C) using a bit expansion operation, a bitwise exclusive OR operation, the selection operations that use the at least one new substitution box generated in step (B), a plurality of bitwise AND operations, and at least one bitwise OR operation to conduct the conversion function computation. The at least one new substitution box is designed according to different bit processing capabilities (e.g., 8 bits, 16 bits, 32 bits), such that the processing capability of a central processing unit can be fully utilized.

28 Claims, 12 Drawing Sheets

U.S. PATENT DOCUMENTS

| | | | |
|---|---|---|---|
| 7,428,305 B1 * | 9/2008 | Hawkes et al. | 380/28 |
| 2003/0156714 A1 * | 8/2003 | Okeya | 380/30 |
| 2004/0193898 A1 * | 9/2004 | Ochi et al. | 713/189 |
| 2008/0170686 A1 | 7/2008 | Nemoto et al. | |
| 2009/0041245 A1 | 2/2009 | Torisaki et al. | |

OTHER PUBLICATIONS

English language Abstract of JP 2000-81841, Mar. 21, 2000.

English language Abstract of JP 1-9561, Jan. 12, 1989.

* cited by examiner

```
0xD8,  0xD7,  0x83,  0x3D,  0x1C,  0x8A,  0xF0,  0xCF,
0x72,  0x4C,  0x4D,  0xF2,  0xED,  0x33,  0x16,  0xE0,
0x8F,  0x28,  0x7C,  0x82,  0x62,  0x37,  0xAF,  0x59,
0xB7,  0xE0,  0x00,  0x3F,  0x09,  0x4D,  0xF3,  0x94,
0x16,  0xA5,  0x58,  0x83,  0xF2,  0x4F,  0x67,  0x30,
0x49,  0x72,  0xBF,  0xCD,  0xBE,  0x98,  0x81,  0x7F,
0xA5,  0xDA,  0xA7,  0x7F,  0x89,  0xC8,  0x78,  0xA7,
0x8C,  0x05,  0x72,  0x84,  0x52,  0x72,  0x4D,  0x38
```

```
0xD8D8,  0xD735,  0x8306,  0x3DAB,  0x1CEC,  0x8A40,
0xF079,  0xCF34,  0x7217,  0x4CFE,  0x4DEA,  0xF247,
0xEDA3,  0x338F,  0x16D5,  0xE048,  0x8F0A,  0x28BC,
0x7CD5,  0x8240,  0x6223,  0x37D7,  0xAF9F,  0x59BB,
0xB77C,  0xE081,  0x00A1,  0x3F7A,  0x0914,  0x4D69,
0xF36A,  0x9496,  0x1647,  0xA5DA,  0x587B,  0x83E8,
0xF2A1,  0x4FBF,  0x6798,  0x3046,  0x49B8,  0x7241,
0xBF45,  0xCD9E,  0xBE5E,  0x9820,  0x81B2,  0x7F35,
0x7865,  0xA7F8,  0x8c0F,  0x05B2,  0x72D2,  0x8845,
0xA5E4,  0xDA2F,  0xA79A,  0x7FB5,  0x89DE,  0xC801,
0x5221,  0x724E,  0x4D2D,  0x38DB,
```

Fig.15

| 0xD8D8DBBC, | 0xD73559C1, | 0x8306F441, | 0x3DABEAFE, |
|---|---|---|---|
| 0x1CEC9542, | 0x8A408EFB, | 0xF079253F, | 0xCF34D510, |
| 0x721726B5, | 0x4CFEF21C, | 0x4DEADAA6, | 0xF2471AC9, |
| 0xEDA34BCF, | 0x338FA826, | 0x16D508D1, | 0xE048253F, |
| 0x6223ABC1, | 0x37D7E0A8, | 0xAF9FD4BC, | 0x59BB1BCF, |
| 0x8F0A4602, | 0x28BC163D, | 0x7CD56B19, | 0x8240BF20, |
| 0xB77C897E, | 0xE0810592, | 0x00A1344B, | 0x3F7AE567, |
| 0x091474BC, | 0x4D697B47, | 0xF36ABB62, | 0x949644D0, |
| 0x1647A960, | 0xA5DAC69A, | 0x587B189E, | 0x83E8BD45, |
| 0xF2A1E679, | 0x4FBF0121, | 0x67986989, | 0x30465AA9, |
| 0x49B899C3, | 0x7241E064, | 0xBF458774, | 0xCD9E619A, |
| 0xBE5E56BC, | 0x982035DB, | 0x81B27643, | 0x7F358E66, |
| 0xA5E4F7DF, | 0xDA2FE8E3, | 0xA79A8421, | 0x7FB513BE, |
| 0x89DE041E, | 0xC8017B16, | 0x78659B73, | 0xA7F8A65D, |
| 0x8C0F7AA2, | 0x05B21FCD, | 0x72D26BBC, | 0x84455C30, |
| 0x5221A967, | 0x724E8634, | 0x4D2D549C, | 0x38DBF9CB, |

CRYPTOGRAPHIC METHOD AND APPARATUS FOR ENHANCING COMPUTATION PERFORMANCE OF A CENTRAL PROCESSING UNIT

TECHNICAL FIELD

The invention relates to a cryptographic method and an apparatus thereof, and more particularly to a cryptographic method and an apparatus thereof that are adapted for use with the Data Encryption Standard (DES) algorithm and that enhance computation performance of a central processing unit.

BACKGROUND ART

Referring to FIG. 1, Data Encryption Standard (DES) algorithm is a technique that uses symmetric encryption, i.e., identical keys are used for both encryption and decryption.

The encryption process mainly involves an input unit 91 inputting a plain text 901 and a key 902 into a block cipher 92, and the block cipher 92 using an internal encryption process to convert the plain text 901 into a cipher text 903, which is subsequently outputted by an output unit 93.

Referring to FIG. 2, detailed encryption steps of the DES technique are: inputting a 64-bit plain text; subjecting the plain text to an initial permutation procedure 801, then to an encryption operation procedure 802, where the encryption operation procedure 802 includes sixteen rounds of encryption operation steps 804; and finally to another permutation, which is the inverse of initial permutation procedure 803.

The initial permutation procedure 801 involves rearranging the order of each bit of data in the 64-bit plain text in accordance with an initial permutation (IP) table.

Each round of the encryption operation steps 804 of the encryption operation procedure 802 mainly involves dividing the 64-bit data into two portions of 32-bit data, namely a right-half portion of data (Ri) and a left-half portion of data (Li); after inputting the right-half portion of data (Ri) and a sub-key (Ki+1) into a function (f) for computation, performing a bitwise exclusive OR (bitwise XOR) operation on the result of the function (f) computation and the left-half portion of data (Li), and making the result of the bitwise XOR operation the right-half portion of data (Ri+1) for the next round of the encryption operation steps 804; and making the original right-half portion of data (Ri) the left-half portion of data (Li+1) for the next round of the encryption operation steps 804.

The inverse of initial permutation procedure 803 involves rearranging the order of each bit of data in the operation result of the encryption operation procedure 802 in accordance with an inverse of initial permutation (IP-1) table for subsequent output as a cipher text.

Referring to FIG. 3, the processing method of the function (f) involves performing an expansion operation on a 32-bit data (Ri), in which the order of each bit of data is rearranged in accordance with a lookup expansion operation chart (E), thereby expanding the 32-bit data (Ri) into a 48-bit data E(Ri). The expansion operation chart (E) is as illustrated in Table 1.

TABLE 1

| 32 | 1  | 2  | 3  | 4  | 5  |
|----|----|----|----|----|----|
| 4  | 5  | 6  | 7  | 8  | 9  |
| 8  | 9  | 10 | 11 | 12 | 13 |
| 12 | 13 | 14 | 15 | 16 | 17 |
| 16 | 17 | 18 | 19 | 20 | 21 |
| 20 | 21 | 22 | 23 | 24 | 25 |
| 24 | 25 | 26 | 27 | 28 | 29 |
| 28 | 29 | 30 | 31 | 32 | 1  |

Subsequently, a bitwise XOR operation is performed on the expanded data E(Ri) and the sub-key (Ki+1). Result obtained from the bitwise XOR operation is evenly allocated to eight substitution boxes, S-boxes, (S1~S8) for a series of selection operations. Each of the S-boxes (Sj) has a different substitution table whose mechanism involves: taking the first and last bits (i.e., two bits) of a 6-bit input data as a row number of the substitution table (4 rows in total); taking the middle four bits of the 6-bit input data as a column number of the substitution table (16 columns in total); and locating a corresponding output data content to serve as a new bit value by taking the row number and the column number as coordinates.

Table 2 is the substitution table of S-box (S1). Suppose that the 6-bit input data of S-box (S1) is (0 1101 1)2, the substitution method considers this 6-bit input data as an index, where the first and last bits (01)2 represent the row 1 in Table 2 (since (01)2=1), and the middle four bits (1101)2 represent the column 13 in Table 2 (since (1101)2=13). Consequently, referring to coordinates (row 1, column 13) in Table 2, a value 5 is obtained, which after converting into a 4-bit output data is (0101)2 (since 5=0101)2). Because there are eight S-boxes (Sj) in total, it can be seen from the above that 6*8=48 bits are inputted, and 4*8=32 bits are outputted. Therefore, after the selection process of each of the S-boxes (Sj), the overall output is restored back to 32 bits in length.

TABLE 2

|     | Column |    |    |    |    |    |    |    |    |    |    |    |    |    |    |    |
|-----|--------|----|----|----|----|----|----|----|----|----|----|----|----|----|----|----|
| Row | 0      | 1  | 2  | 3  | 4  | 5  | 6  | 7  | 8  | 9  | 10 | 11 | 12 | 13 | 14 | 15 |
| 0   | 14     | 4  | 13 | 1  | 2  | 15 | 11 | 8  | 3  | 10 | 6  | 12 | 5  | 9  | 0  | 7  |
| 1   | 0      | 15 | 7  | 4  | 14 | 2  | 13 | 1  | 10 | 6  | 12 | 11 | 9  | 5  | 3  | 8  |
| 2   | 4      | 1  | 14 | 8  | 13 | 6  | 2  | 11 | 15 | 12 | 9  | 7  | 3  | 10 | 5  | 0  |
| 3   | 15     | 12 | 8  | 2  | 4  | 9  | 1  | 7  | 5  | 11 | 3  | 14 | 10 | 0  | 6  | 13 |

Lastly, the overall output of all of the S-boxes (Sj) needs to go through a permutation operation, whose method involves rearranging the location of each bit of data of the 32 bits in accordance with a permutation table (P), the result of which is the output of the function (f). Arrangement indices of the permutation table (P) are as shown in Table 3.

TABLE 3

| 16 | 7  | 20 | 21 |
|----|----|----|----|
| 29 | 12 | 28 | 17 |

TABLE 3-continued

| 1  | 15 | 23 | 26 |
|----|----|----|----|
| 5  | 18 | 31 | 10 |
| 2  | 8  | 24 | 14 |
| 32 | 27 | 3  | 9  |
| 19 | 13 | 30 | 6  |
| 22 | 11 | 4  | 25 |

As for the decryption process, it is the reverse of the encryption process, where a cipher text can be restored back to its original plain text through reverse operations carried out in the encryption process.

As can be seen from the above, the function (f) computation requires undergoing the steps of a bit expansion operation, a bitwise exclusive OR operation, a series of selection operations and a permutation operation, where limited to the existing standard processing procedure, each S-box (Sj) in the selection operations can only output 4 bits each time. However, as the bit processing capability of central processing units (CPU) improves continuously, higher bits of data can be processed during each computation. Therefore, when a central processing unit with a higher-bit (e.g., 8-bit, 16-bit, or 32-bit) processing capability is used, the processing capability thereof cannot be fully utilized.

DISCLOSURE OF INVENTION

Therefore, the object of the present invention is to provide a cryptographic method and apparatus that operate according to bit processing capability of a central processing unit, and that enhance computation performance of the central processing unit.

The cryptographic method for enhancing computation performance of a central processing unit according to the present invention involves the execution of a conversion function of the cryptographic method by the central processing unit. The conversion function comprises a bit expansion operation, a bitwise exclusive OR operation, a series of selection operations, and a plurality of bitwise logical operations. The selection operations require the use of a plurality of substitution boxes.

The method comprises the steps of: (A) detecting a processing bit length of the central processing unit; (B) generating at least one new substitution box from original substitution boxes according to the processing bit length and a bit permutation sequence, each of the at least one new substitution box containing a plurality of new substitution values whose bit length is equal to the processing bit length; and (C) using the bit expansion operation, the bitwise exclusive OR operation, the selection operations that use the at least one new substitution box generated in step (B), a plurality of bitwise AND operations, and at least one bitwise OR operation to conduct the conversion function.

The cryptographic apparatus for enhancing computation performance of a central processing unit according to the present invention comprises a central processing unit and a block cipher. The block cipher includes a substitution box generating unit, a key generating unit, and a cryptographic processing unit.

The central processing unit, which has a processing capability of a processing bit length, is for executing a conversion function of a cryptographic method. The conversion function comprises a bit expansion operation, a bitwise exclusive OR operation, a series of selection operations, and a plurality of bitwise logical operations. The selection operations require the use of a plurality of substitution boxes.

The substitution box generating unit is for detecting the processing bit length, and for generating at least one, new substitution box from original substitution boxes according to the processing bit length and a bit permutation sequence. The key generating unit is for executing a sub-key generating procedure.

The cryptographic processing unit is for receiving a plain text/cipher text data and for utilizing the central processing unit to conduct the conversion function by means of the bit expansion operation, the bitwise exclusive OR operation that uses the sub-key, the selection operations that use the at least one new substitution box generated by the substitution box generating unit, a plurality of bitwise AND operations, and at least one bitwise OR operation.

In the cryptographic method and apparatus according to the present invention, the at least one new substitution box is generated according to the processing bit length of a central processing unit and a specific bit permutation sequence, each of the new substitution box has a plurality of the new substitution values whose bit length is equal to the processing bit length. Therefore, the processing capability of various central processing units with different bit processing capabilities (e.g., 8 bits, 16 bits, 32 bits) can be fully utilized.

BRIEF DESCRIPTION OF DRAWINGS

Other features and advantages of the present invention will become apparent in the following detailed description of the preferred embodiment with reference to the accompanying drawings, of which:

FIG. 15 is a lookup table, which contains new substitution values of the substitution box in FIG. 14.

BEST MODE FOR CARRYING OUT THE INVENTION

Figure 1:
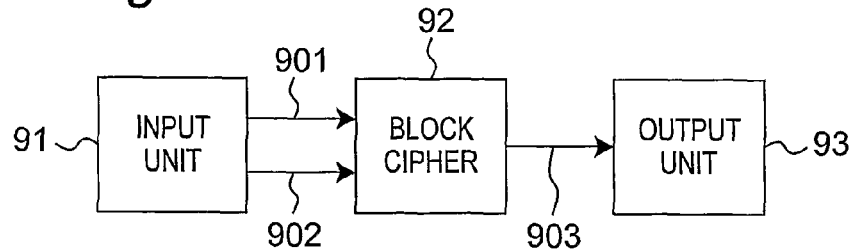
FIG. 1 is a system block diagram, illustrating an apparatus implementing Data Encryption Standard (DES) algorithm.
Figure 2:
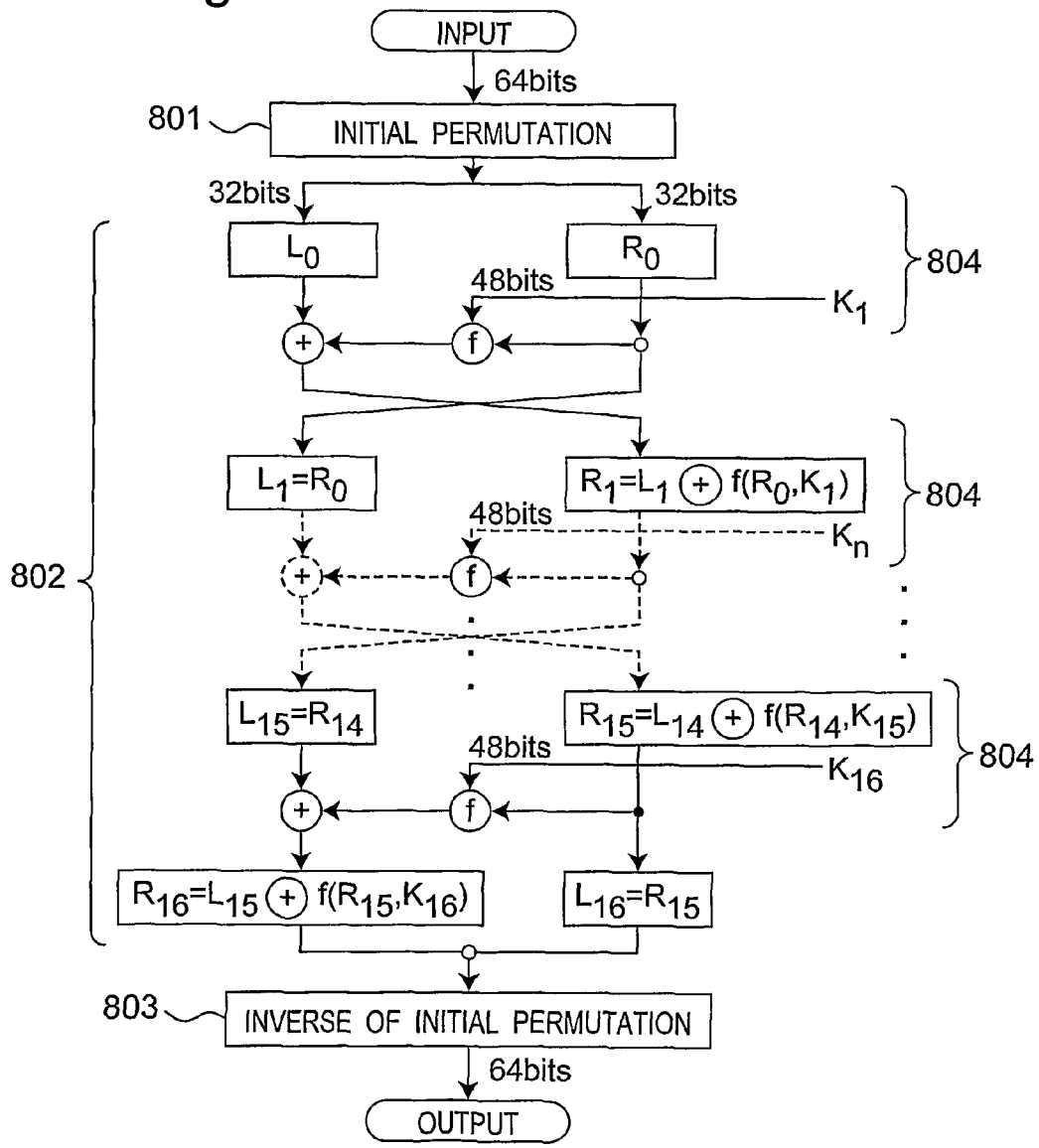
FIG. 2 is a flow chart, illustrating the encryption process of, the Data Encryption Standard (DES) algorithm.
Figure 3:
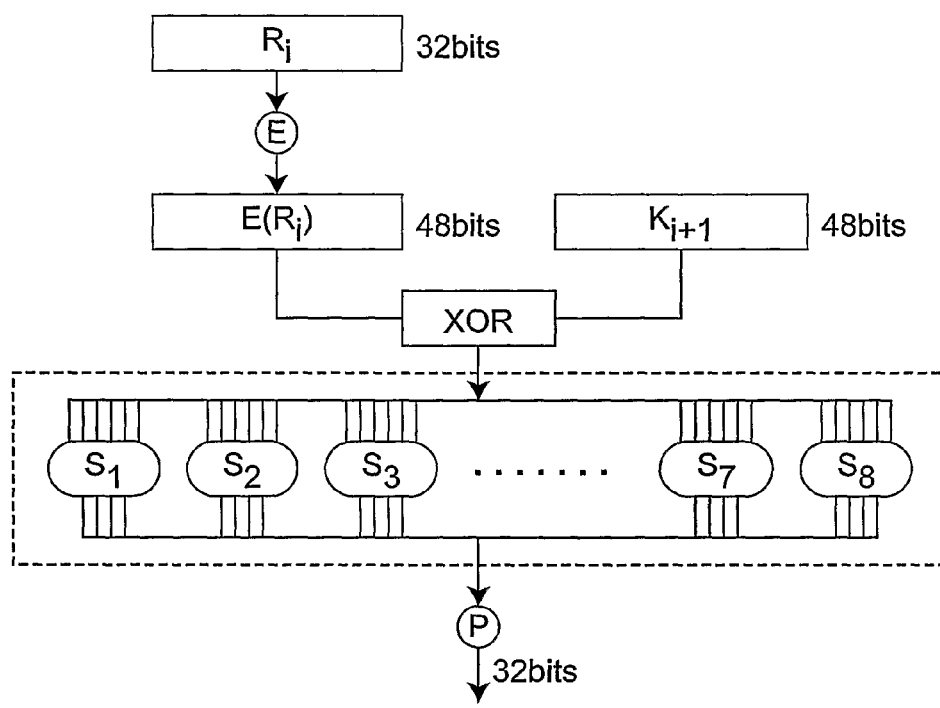
FIG. 3 is a flow chart, illustrating the computation of the function (f) in FIG. 2.

Before the present invention is described in greater detail, it should be noted that like elements are denoted by the same reference numerals throughout the disclosure.

Figure 4:
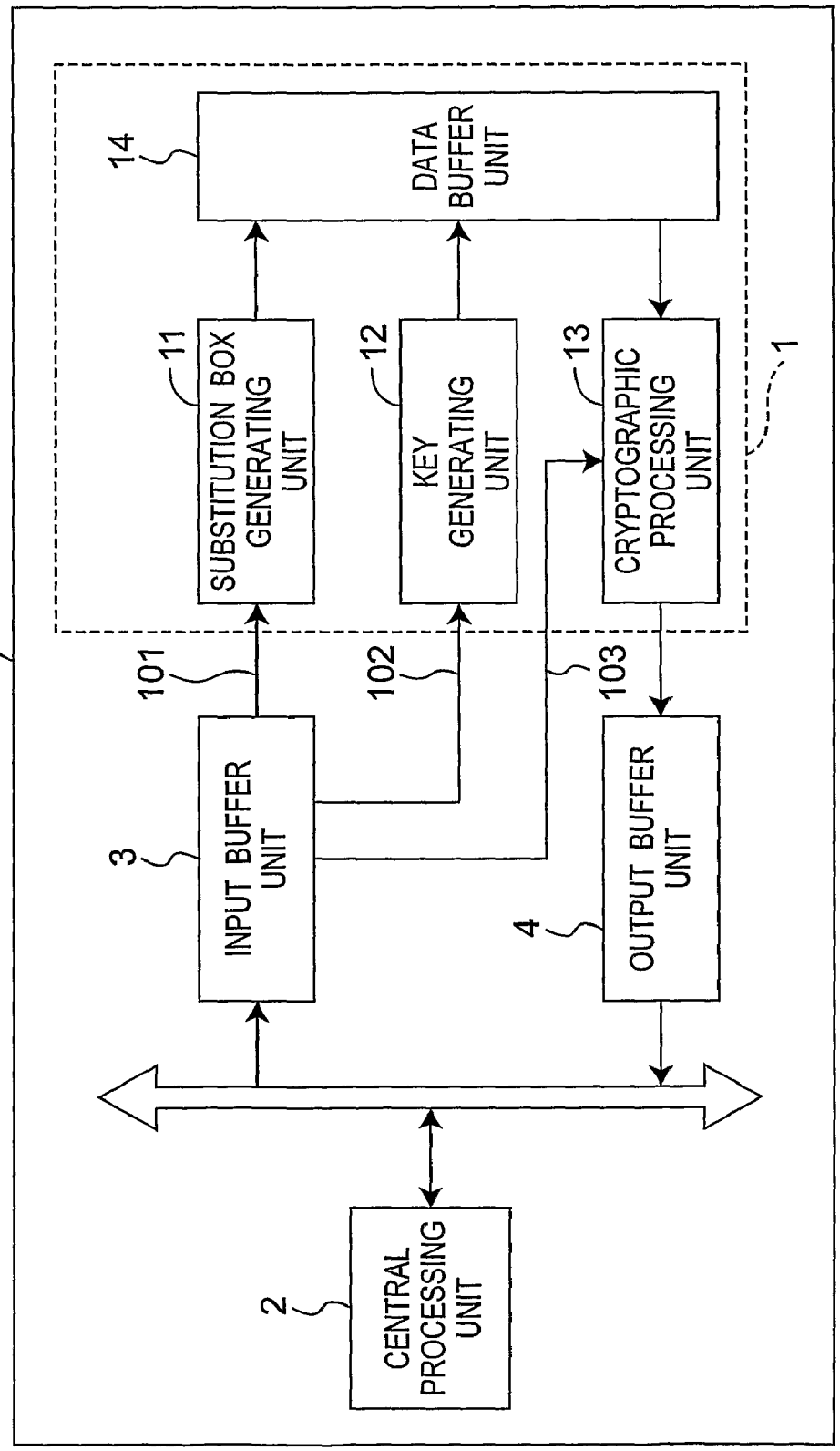
FIG. 4 is a system block diagram, illustrating the preferred embodiment of a cryptographic apparatus for enhancing computation performance of a central processing unit according to the present invention.

Referring to FIG. 4, in the preferred embodiment of a cryptographic apparatus 100 according to the present invention, a central processing unit 2 executes a conversion function of a cryptographic method. The conversion function comprises a bit expansion operation, a bitwise exclusive OR operation, a series of selection operations, and a plurality of bitwise logical operations. The selection operations require the use of a plurality of substitution boxes.

The conversion function is similar to the function (f) of the Data Encryption Standard (DES), and the only difference lies in that the present invention utilizes the processing bit length of the central processing unit 2 and a bit permutation sequence same as that referenced by the permutation operation of the function (f) to obtain new substitution boxes for performing the selection operations. After the application of suitable bitwise AND and bitwise OR operations on the results of the selection operations, the conversion function can directly produce the same result as that of the function (f) without the original permutation operation.

The cryptographic apparatus 100 comprises a block cipher 1, a central processing unit 2, an input buffer unit 3, and an output buffer unit 4.

Here, the input buffer unit 3 receives and temporarily stores a processing bit length (e.g., 8-bit, 16-bit, or 32-bit) of the central processing unit 2, and information such as parameters (key, plain text/cipher text) necessary for the cryptographic computation.

The block cipher 1 includes a substitution box generating unit 11, a key generating unit 12, an cryptographic processing unit 13, and a data buffer unit 14.

The substitution box generating unit 11 is for generating at least one new substitution box according to a processing bit length data 101 in the input buffer unit 3 and a bit permutation sequence, and for temporarily storing the at least one new substitution box in the data buffer unit 14.

The key generating unit 12 receives a key 102 in the input buffer unit 3 so as to execute a sub-key (Ki+1) generating procedure for generating a 48-bit sub-key (Ki+1), and temporarily stores the sub-key (Ki+1) in the data buffer unit 14.

The cryptographic processing unit 13 receives a 48-bit data E(Ri) 103 from the input buffer unit 3, and obtains the sub-key (Ki+1) and the at least one new substitution box from the data buffer unit 14 for executing the encryption process. As mentioned earlier, the plain text/cipher text undergoes sixteen rounds of encryption operations, wherein each round requires performing the bit expansion operation on a data (Ri) to derive a 48-bit data E(Ri) by referring to an expansion operation table (E); performing a bitwise exclusive OR operation on the data E(Ri) and the sub-key (Ki+1) that are both 48 bits in data length; evenly allocating a 48-bit result obtained to each of the at least one new substitution box for a selection operation; and finally applying suitable bitwise AND and bitwise OR operations on the selection result to derive the same result as that of the function (f) without the original permutation operation so that it can be further processed by the Data Encryption Standard (DES).

The output buffer unit 4 outputs the cipher text/plain text that has undergone the encryption or decryption processing by the cryptographic processing unit 13. Since the Data Encryption Standard algorithm is adopted, the technical principle of which is known in the art and is not the feature of the present invention, further details of the same are omitted herein.

Figure 5:
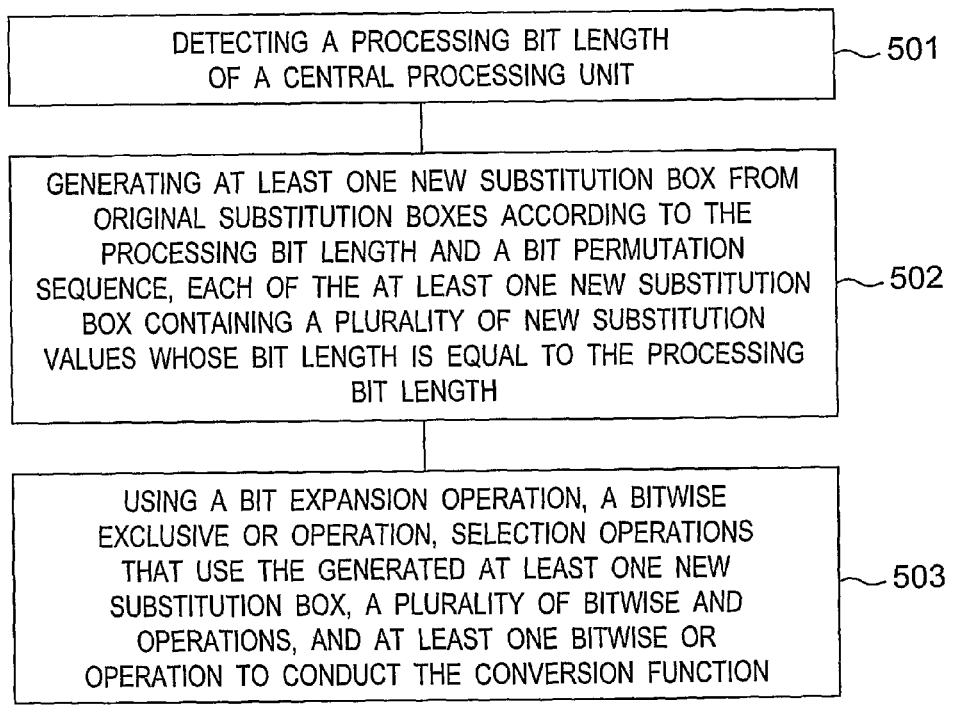
FIG. 5 is a flow chart, illustrating the preferred embodiment of a cryptographic method that enhances the computation performance of a central processing unit according to the present invention.

Referring to FIG. 4 and FIG. 5, the cryptographic method for enhancing computation performance of a central processing unit according to the present invention comprises the following steps: detecting, by the block cipher 1, a processing bit length of the central processing unit 2 (step 501); next, generating, by the block cipher 1, at least one new substitution box according to the processing bit length and a bit permutation sequence, each of the at least one new substitution box containing a plurality of new substitution values whose bit length is equal to the processing bit length (step 502); and using the bit expansion operation, the bitwise exclusive OR operation, the selection operations that utilize the at least one new substitution box generated by step (502), a plurality of bitwise AND operations, and at least one bitwise OR operation to conduct the conversion function (step 503).

Since the encryption apparatus 100 uses the central processing unit 2 to execute the conversion function similar to function (f) of the Data Encryption Standard, and since the length of the new substitution values of each of the at least one new substitution box is equal to the processing bit length in the present invention, optimal computation performance of the central processing unit 2 can be achieved.

Figure 6:
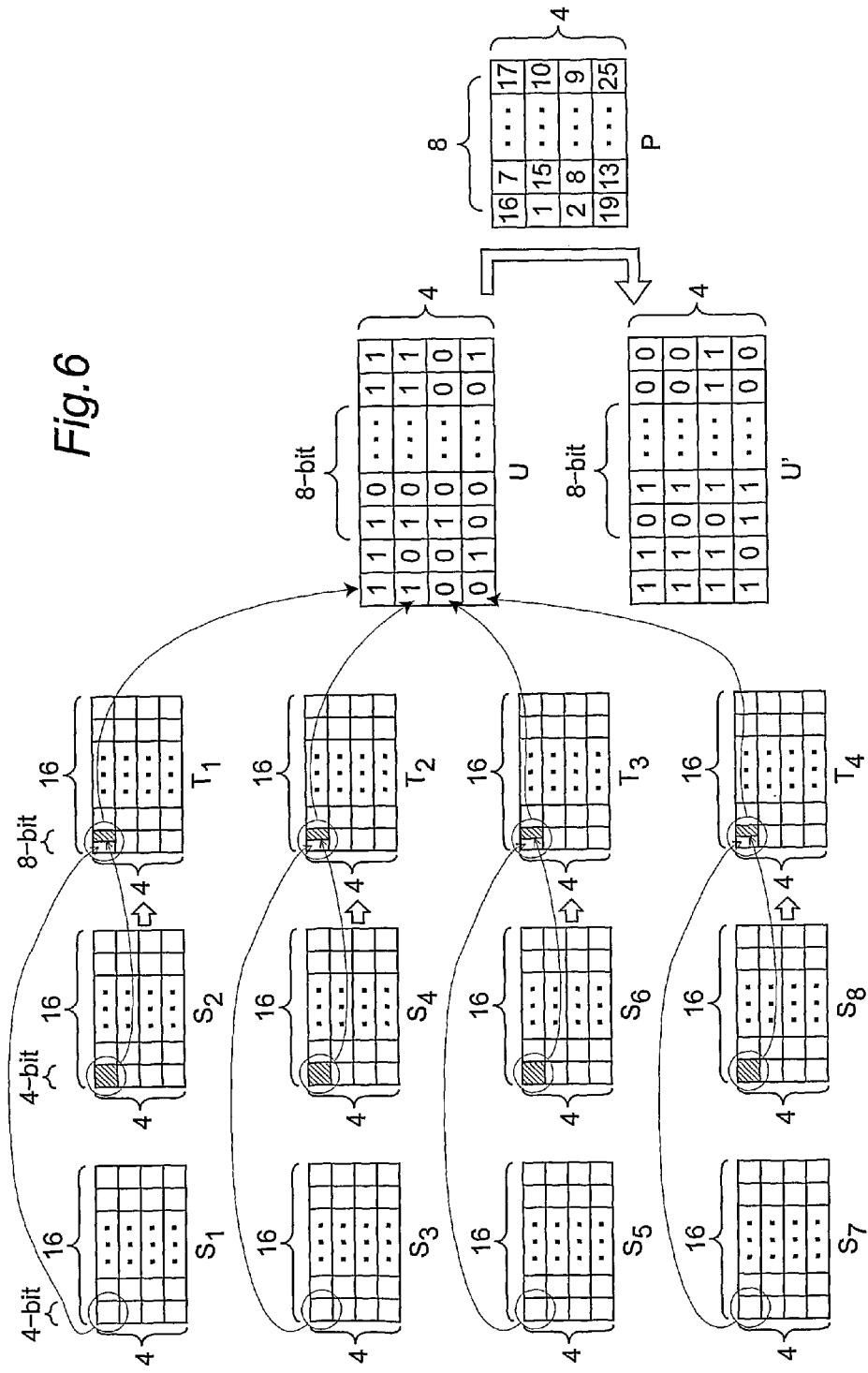
FIG. 6 is a schematic diagram, illustrating the principle of constructing substitution values of new substitution boxes involving generating a sequence in advance.

As shown in FIG. 6, the construction of the new substitution values is based on the eight S-boxes (S1~S8) of the original Data Encryption Standard (DES). The new substitution values of each of the at least one new substitution box are the results of combining and then rearranging the substitution values of at least one original S-box. In the original Data Encryption Standard, each of the S-boxes (S1~S8) is a matrix containing 4*16 substitution values, each substitution value being 4 bits.

Before the at least one new substitution box is constructed, the original S-boxes (S1~S8) need to be combined in pairs, i.e., (S1, S2), (S3, S4), (S5, S6), (S7, S8), to form four temporary matrices (T1~T4) that are subsequently rearranged. Since each of the substitution values of the original S-boxes (S1~S8) is 4 bits, each substitution value of the temporary matrices (T1-T4) is expanded to 8 bits.

In this preferred embodiment, the combining method involves designating the substitution value of one of the two original S-boxes the most significant byte (MSB), and the substitution value of the other one of the two original S-boxes the least significant byte (LSB).

A substitution value (8 bits) at a correspondingly same location in each of the temporary matrices (T1~T4) is obtained in the order from (T1) to (T4), and is sequentially inputted into a 8*4=32-bit temporary matrix (U). Subsequently, the bit locations of the temporary matrix (U) are interchanged according to a lookup table (P) so that the temporary matrix (U) will be changed into a temporary matrix (U'). In this manner, after all corresponding locations in the temporary matrices (T1~T4) are processed using the above procedure, 4*16 temporary matrices (U') will be obtained with each of the temporary matrices (U') being referred to as a 32-bit sequence.

The principle of the present invention in constructing the substitution values of the at least one new substitution box involves combining and then rearranging the at least one original S-box, the method of which involving taking the substitution values at the correspondingly same locations sequentially from the at least one original S-box to form a 32-bit sequence, and then sequentially allocating the 32-bit sequence to the at least one new substitution box according to a specific bit permutation sequence so that the bit length of each of the new substitution values of the at least one new substitution box is equal to the processing bit length.

It should be noted herein that if the processing capability of the central processing unit 2 is 8 bits, the 32-bit sequence is divided into four segments for processing by the central processing unit 2. Each of the segments is 8 bits, and arrangement indices of the bits in the segments are [16, 7, 20, 21, 29, 21, 28, 17], [1, 15, 23, 26, 5, 18, 31, 10], [2, 8, 24, 14, 32, 27, 3, 9] and [19, 13, 30, 6, 22, 11, 4, 25], respectively. If the processing capability of the central processing unit 2 is 16 bits, the 32-bit sequence is divided into two segments for processing by the central processing unit 2. Each of the segments is 16 bits, and the arrangement indices of the bits in the segments are [16, 7, 20, 21, 29, 12, 28, 17, 1, 15, 23, 26, 5, 18, 31, 10], and [2, 8, 24, 14, 32, 27, 3, 9, 19, 13, 30, 6, 22, 11, 4, 25], respectively. If the processing capability of the central processing unit 2 is 32 bits, the whole 32-bit sequence is regarded as a 32-bit segment. The arrangement indices of the bits in the segment are [16, 7, 20, 21, 29, 12, 28, 17, 1, 15, 23, 26, 5, 18, 31, 10, 2, 8, 24, 14, 32, 27, 3, 9, 19, 13, 30, 6, 22, 11, 4, 25].

Since the cryptographic processing unit 13 divides each of the temporary matrices (U') (containing a total of 32 bits) so as to obtain the at least one new substitution box according to the processing capability of the central processing unit 2, the 48-bit data will be evenly allocated into the at least one new substitution box for conversion. Presented in the following are the illustrations with reference to various embodiments, where the processing capabilities are 8-bit, 16-bit and 32-bit, respectively.

Figure 7:
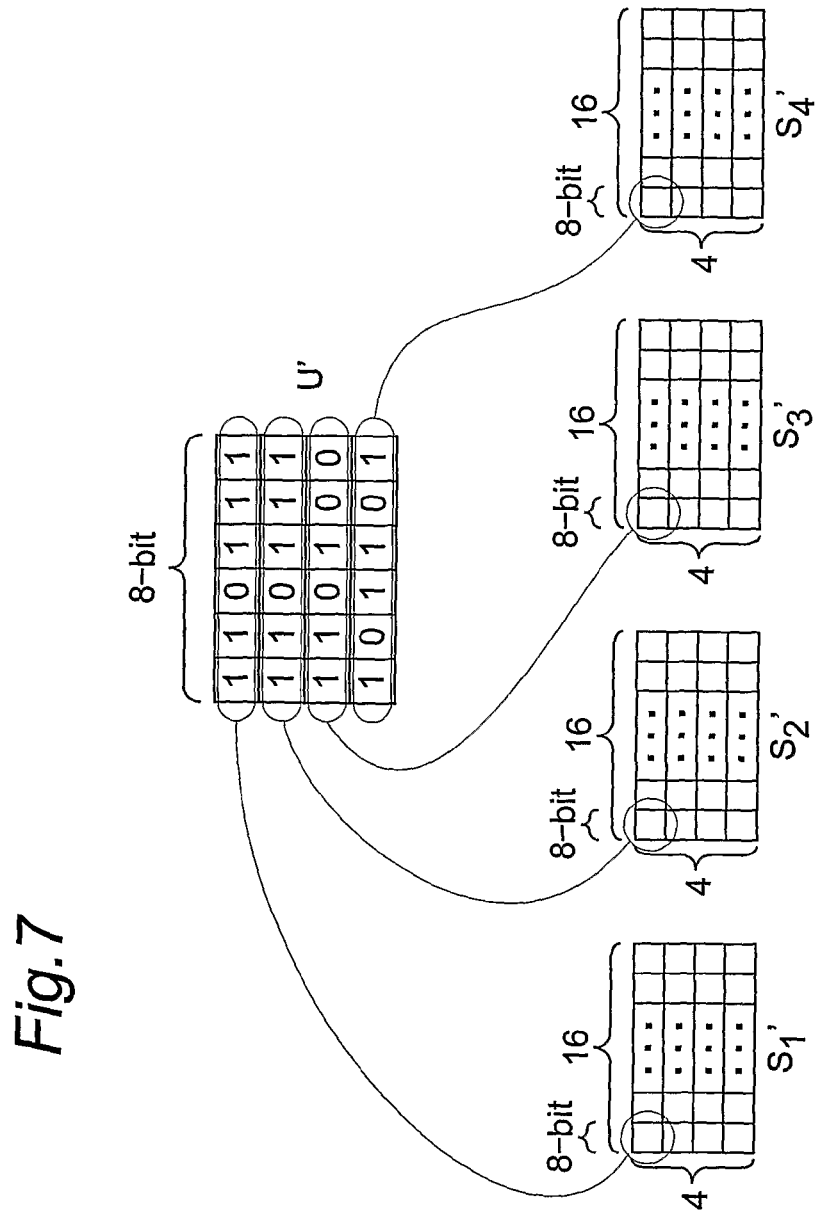
FIG. 7 is a schematic diagram, illustrating after the sequence obtained in FIG. 6 is divided into four portions, evenly allocating each of the four portions to corresponding four substitution boxes to serve as a new substitution value.

1. The at least one new substitution box when the central processing unit has a processing capability of 8 bits:

As shown in FIG. 7, in order to conform to the 8-bit processing capability of the central processing unit 2, the 32 bits in the temporary matrix (U') are divided into four portions and are then evenly allocated to four new substitution boxes to serve as new substitution values in the new substitution boxes. Each of the new substitution boxes still has 4*16 substitution values with each of the substitution values being 8 bits.

Figure 8:
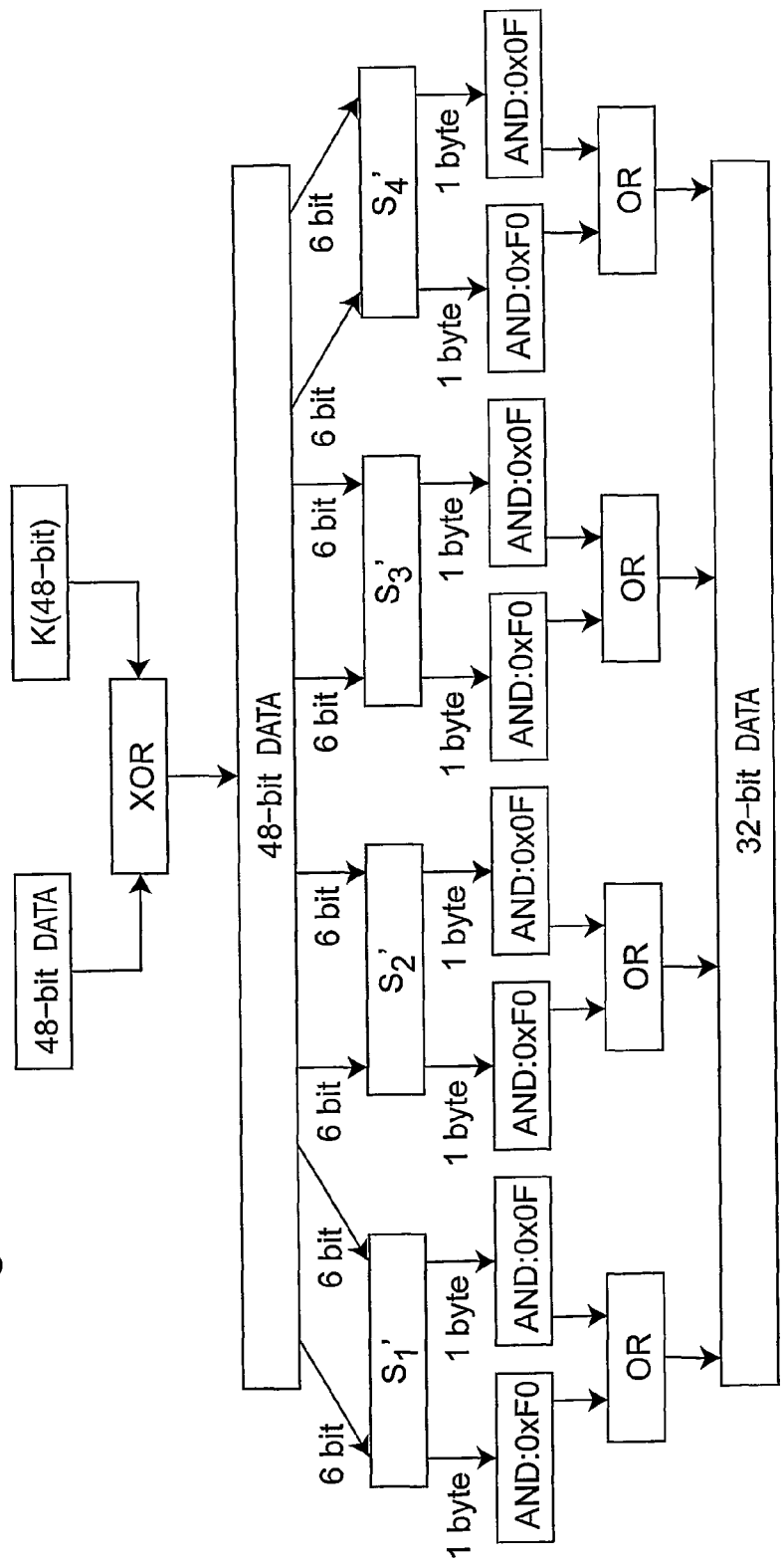
FIG. 8 is a flow chart, illustrating the steps of configuring four substitution boxes and maintaining a 32-bit output when the processing capability of a central processing unit is 8 bits.

As shown in FIG. 8, each of the new substitution boxes (S1'~S4') has two sets of 8-bit outputs as the results of the selection operations. The two sets of 8-bit outputs will undergo proper bitwise AND operations to obtain the desired bit data. The resulting bit data will then undergo suitable bitwise OR operations to produce the result of the conversion function.

In this preferred embodiment, where the processing capability of the central processing unit 2 is 8 bits, four new substitution boxes are configured, such that each of the new substitution boxes (S1'~S4') is allocated with 48 bits/4=12 bits of data. These 12 bits are divided into two sets of 6 bits, and the two sets of 6 bits are taken as indices for respectively obtaining two 8-bit substitution values from the corresponding new substitution boxes (S1'~S4'). Shown in FIG. 9 are the new substitution values of one of the new substitution boxes (S1') of FIG. 8.

Referring again to FIG. 8, after two 8-bit substitution values from each of the new substitution boxes (S1'~S4') are obtained, a bitwise AND operation is performed on each 8-bit substitution value. In other words, the most significant four bits of one of the substitution values and the least significant four bits of the other one of the substitution values are obtained and combined through a bitwise OR operation to produce an 8-bit data output. Since there are four new substitution boxes (S1'~S4') in total, the overall output remains 8*4=32 bits.

Figures 9, 10:
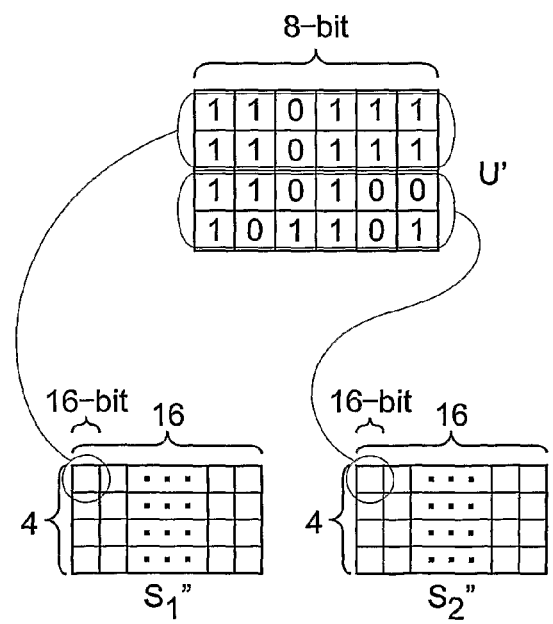
FIG. 9 is a lookup table, which contains new substitution values of one of the substitution boxes in FIG. 8.
FIG. 10 is a schematic diagram, illustrating after the sequence obtained in FIG. 6 is divided into two portions, evenly allocating each of the two portions to corresponding two substitution boxes to serve as a new substitution value.

2. The at least one new substitution box when the central processing unit has a processing capability of 16 bits:

As shown in FIG. 10, in order to conform to the 16-bit processing capability of the central processing unit 2, the 32 bits in the temporary matrix (U') are divided into two portions and are then evenly allocated to two new substitution boxes (S1"~S2") to serve as new substitution values in the new substitution boxes. Each of the new substitution boxes still has 4*16 substitution values with each of the substitution values being 16 bits.

Figure 11:
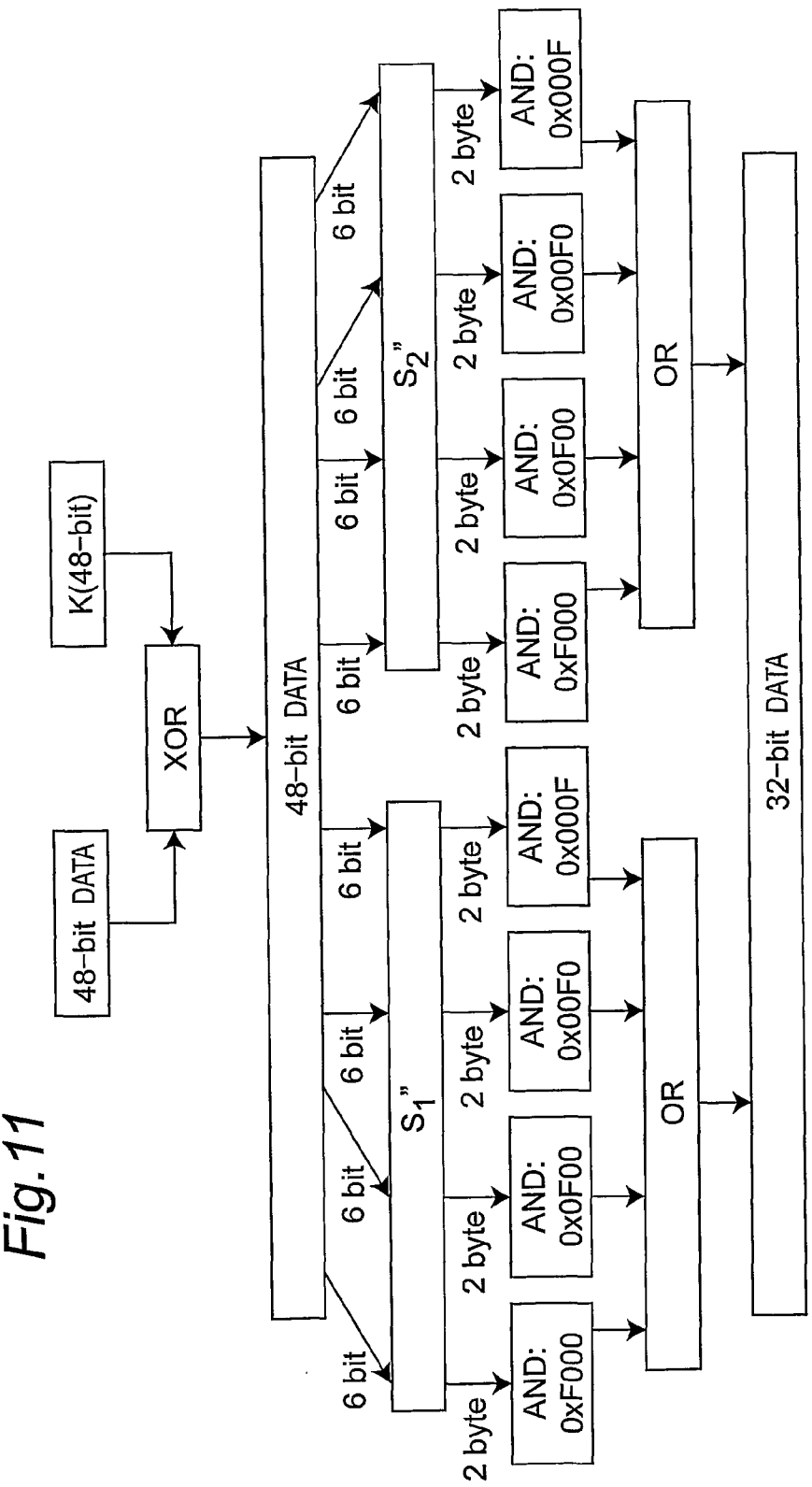
FIG. 11 is a flow chart, illustrating the steps of configuring two substitution boxes and maintaining a 32-bit output when the processing capability of a central processing unit is 16 bits.

As shown in FIG. 11, each of the new substitution boxes (S1"~S2") has four sets of 16-bit outputs as the results of the selection operations. The four sets of 16-bit output will undergo proper bitwise AND operations to obtain the desired bit data. The resulting bit data will then undergo suitable bitwise OR operations to produce the result of the conversion function.

Since the processing capability of the central processing unit 2 is 16 bits, two new substitution boxes are configured, such that each of the new substitution boxes (S1"~S2") is allocated with 48 bits/2=24 bits of data. These 24 bits are divided into four sets of 6 bits, and the four sets of 6 bits are taken as indices for respectively obtaining four 16-bit substitution values from the corresponding new substitution boxes (S1"~S2"). Shown in FIG. 12 are the new substitution values of one of the new substitution boxes (S1") of FIG. 11.

Referring again to FIG. 11, after four 16-bit substitution values from each the new substitution boxes (S1"~S2") are obtained, a bitwise AND operation is performed on each 16-bit substitution value. In other words, each substitution value is divided into four equal portions with each portion being 4 bits. A first 4-bit portion of data is obtained from the first substitution value, a second 4-bit portion of data is obtained from the second substitution value, a third 4-bit portion of data is obtained from the third substitution value, and a fourth 4-bit portion of data is obtained from the fourth substitution value, and the four 4-bit data portions thus obtained are combined through a bitwise OR operation to produce a 16-bit data output. Since there are two new substitution boxes (S1"~S2") in total, the overall output remains 16*2=32 bits.

Figures 12, 13:
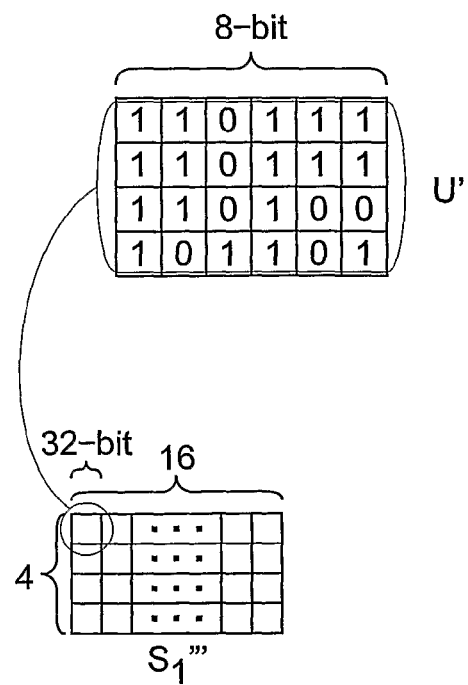
FIG. 12 is a lookup table, which contains new substitution values of one of the substitution boxes in FIG. 11.
FIG. 13 is a schematic diagram, illustrating allocating the sequence obtained in FIG. 6 to a substitution box to serve as its new substitution values.

3. The new substitution box when the central processing unit has a processing capability of 32 bits:

As shown in FIG. 13, in order to conform to the 32-bit processing capability of the central processing unit 2, the 32 bits in the temporary matrix (U') are directly allocated to a new substitution box (S1''') to serve as a new switch value thereof. The new substitution box (S1''') still has 4*16 substitution values with each of the substitution values being 32 bits.

Figure 14:
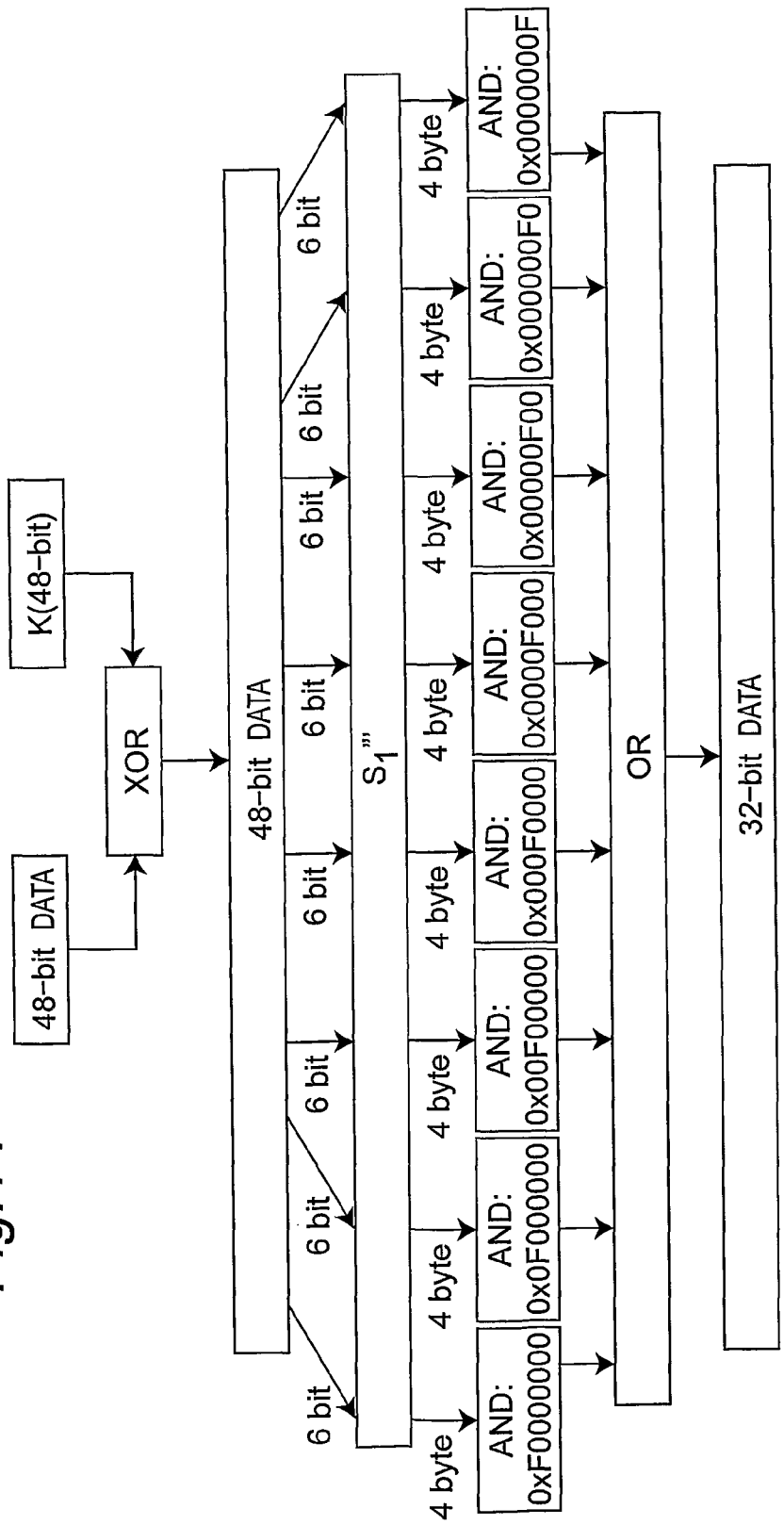
FIG. 14 is a flow chart, illustrating the steps of configuring one substitution box and maintaining a 32-bit output when the processing capability of a central processing unit is 32 bits.

As shown in FIG. 14, the new substitution box (S1''') has eight sets of 32-bit outputs as the results of the selection operations. The eight sets of the 32-bit outputs will undergo proper bitwise AND operations to obtain the desired bit data. The resulting bit data will then undergo a bitwise OR operation to produce the result of the conversion function.

Since the processing capability of the central processing unit 2 is 32 bits, one new substitution box is configured, such that the new substitution box (S1''') is allocated with 48 bits of data. These 48 bits are divided into eight sets of 6 bits, and the eight sets of 6 bits are taken as indices for respectively obtaining eight 32-bit substitution values from the new substitution box (S1'''). Shown in FIG. 15 are the new substitution values of the new substitution box (S1''') of FIG. 14.

Referring again to FIG. 14, after eight 32-bit substitution values from the new substitution box (S1''') are obtained, a bitwise AND operation is performed on each eight 32-bit substitution value. In other words, each of the substitution values is divided into eight equal portions with each portion being 4 bits. A first 4-bit portion of data is obtained from the first substitution value, a second 4-bit portion of data is obtained from the second substitution value, so on and so forth, a seventh 4-bit portion of data is obtained from the seventh substitution value, and an eighth 4-bit portion of data is obtained from the eighth substitution value, and the eight 4-bit data portions thus obtained are combined through a bitwise OR operation to produce a 32-bit data output. Since there is only one new substitution box (S1'''), the overall output remains 32*1=32 bits.

In sum, the cryptographic method and the cryptographic apparatus for enhancing computation performance of a central processing unit according to this invention are designed to generate at least one new substitution box corresponding to a processing bit length of the central processing unit and a specific bit permutation sequence. Each of the at least one new substitution box has a plurality of new substitution values whose bit length is equal to the processing bit length. Consequently, for central processing units with processing capabilities over 4 bits (e.g., 8 bits, 16 bits or 32 bits), the processing capability thereof can be fully utilized.

However, the aforementioned is merely the preferred embodiment of the present invention, and should not be taken to limit the scope of implementation of the present invention. In other words, any simple equivalent variation and modification based on the claims and the contents of the specification of the present invention are included within the scope of the present invention.

Industrial Applicability

The present invention can be applied to a cryptographic method and apparatus for enhancing computation performance of a central processing unit.

The invention claimed is:

1. A cryptographic method for enhancing computation performance of a central processing unit, the central processing unit executing a conversion function of the cryptographic method, the conversion function comprising a bit expansion operation, a bitwise exclusive OR operation, a series of selection operations and a plurality of bitwise logical operations, the selection operations requiring the use of a plurality of substitution boxes, the method comprising the steps of:
   (A) detecting a processing bit length of the central processing unit;
   (B) generating at least one new substitution box from original substitution boxes according to the processing bit length and a bit permutation sequence, each of the at least one new substitution box containing a plurality of new substitution values whose bit length is equal to the processing bit length; and
   (C) using the bit expansion operation, the bitwise exclusive OR operation, the selection operations that utilize the at least one new substitution box generated in step (B), a plurality of bitwise AND operations, and at least one bitwise OR operation to conduct the conversion function.

2. The cryptographic method for enhancing computation performance of a central processing unit as claimed in claim 1, wherein the bit permutation sequence complies with that of the permutation operation of the function (f) of a Data Encryption Standard (DES) algorithm and the conversion function produces the same result as that of the function (f) of a Data Encryption Standard (DES) algorithm.

3. The cryptographic method for enhancing computation performance of a central processing unit as claimed in claim 1, wherein when the processing bit length of the central processing unit detected in step (A) is 8 bits, the new substitution values of each of the at least one new substitution box in step (B) are the results of combining and then rearranging the substitution values of at least one original substitution box, such that the bit length of each of the new substitution values is 8 bits.

4. The cryptographic method for enhancing computation performance of a central processing unit as claimed in claim 3, wherein the substitution values of each of the at least one new substitution box are obtained by: combining corresponding pairs of the original substitution boxes into combined substitution boxes; forming a 32-bit sequence from substitution values of the combined substitution boxes at correspondingly same locations in the combined substitution boxes; rearranging the 32-bit sequence according to the bit permutation sequence; and allocating the 32-bit sequence into four of the new substitution boxes, the bit length of each of the new substitution values being 8 bits.

5. The cryptographic method for enhancing computation performance of a central processing unit as claimed in claim 4, wherein the 32-bit sequence is divided into four segments for processing by the central processing unit, each segment being 8 bits, and arrangement indices of bits in the segments being [16, 7, 20, 21, 29, 21, 28, 17], [1, 15, 23, 26, 5, 18, 31, 10], [2, 8, 24, 14, 32, 27, 3, 9] and [19, 13, 30, 6, 22, 11, 4, 25], respectively.

6. The cryptographic method for enhancing computation performance of a central processing unit as claimed in claim 4, wherein in step (C), each of the new substitution boxes has two sets of 8-bit outputs as the result of a corresponding selection operation, the 8-bit outputs respectively undergoing proper bitwise AND operations to obtain a desired bit data, the desired bit data producing the result of the conversion function after undergoing suitable bitwise OR operations.

7. The cryptographic method for enhancing computation performance of a central processing unit as claimed in claim 1, wherein when the processing bit length of the central processing unit detected in step (A) is 16 bits, the new substitution values of each of the at least one new substitution box in step (B) are the results of combining and then rearranging the substitution values of at least one original substitution box, such that the bit length of each of the new substitution values is 16 bits.

8. The cryptographic method for enhancing computation performance of a central processing unit as claimed in claim 7, wherein the substitution values of each of the at least one new substitution box are obtained by: combining corresponding pairs of the original substitution boxes into combined substitution boxes; forming a 32-bit sequence from substitution values of the combined substitution boxes at correspondingly same locations in the combined substitution boxes; rearranging the 32-bit sequence according to the bit permutation sequence; and allocating the 32-bit sequence into two of the new substitution boxes, the bit length of each of the new substitution values being 16 bits.

9. The cryptographic method for enhancing computation performance of a central processing unit as claimed in claim 8, wherein the 32-bit sequence is divided into two segments for processing by the central processing unit, each segment being 16 bits, and arrangement indices of bits in the segments being [16, 7, 20, 21, 29, 12, 28, 17, 1, 15, 23, 26, 5, 18, 31, 10], and [2, 8, 24, 14, 32, 27, 3, 9, 19, 13, 30, 6, 22, 11, 4, 25], respectively.

10. The cryptographic method for enhancing computation performance of a central processing unit as claimed in claim 8, wherein in step (C), each of the new substitution boxes has four sets of 16-bit outputs as the result of a corresponding selection operation, the 16-bit outputs respectively undergoing proper bitwise AND operations to obtain a desired bit data, the desired bit data producing the result of the conversion function after undergoing suitable bitwise OR operations.

11. The cryptographic method for enhancing computation performance of a central processing unit as claimed in claim 1, wherein when the processing bit length of the central processing unit detected in step (A) is 32 bits, the new substitution values of each of the at least one new substitution box in step (B) are the results of combining and then rearranging the substitution values of at least one original substitution box, such that the bit length of each of the new substitution values is 32 bits.

12. The cryptographic method for enhancing computation performance of a central processing unit as claimed in claim 11, wherein the substitution values of each of the at least one new substitution box are obtained by: combining corresponding pairs of the original substitution boxes into combined substitution boxes; forming a 32-bit sequence from substitution values of the combined substitution boxes at correspondingly same locations in the combined substitution boxes; rearranging the 32-bit sequence according to the bit permutation sequence; and allocating the 32-bit sequence into the new substitution box, the bit length of each of the new substitution values being 32 bits.

13. The cryptographic method for enhancing computation performance of a central processing unit as claimed in claim 12, wherein the 32-bit sequence is a single segment for processing by the central processing unit, and arrangement indices of bits in the segment are [16, 7, 20, 21, 29, 12, 28, 17, 1, 15, 23, 26, 5, 18, 31, 10, 2, 8, 24, 14, 32, 27, 3, 9, 19, 13, 30, 6, 22, 11, 4, 25].

14. The cryptographic method for enhancing computation performance of a central processing unit as claimed in claim 12, wherein in step (C), the new substitution box has eight sets of 32-bit outputs as the result of a corresponding selection operation, the 32-bit outputs respectively undergoing proper bitwise AND operations to obtain a desired bit data, the bit data producing the result of the conversion function after undergoing a bitwise OR operation.

15. A cryptographic apparatus for enhancing computation performance of a central processing unit, comprising:
a central processing unit having a processing capability of a processing bit length, said central processing unit being for executing a conversion function of a cryptographic method, the conversion function comprising a bit expansion operation, a bitwise exclusive OR operation, a series of selection operations, and a plurality of bitwise logical operations, the selection operations requiring the use of a plurality of substitution boxes; and
a block cipher, including:
a substitution box generating unit for detecting the processing bit length, and for generating at least one new substitution box from original substitution boxes according to the processing bit length and a bit permutation sequence;
a key generating unit for executing a sub-key generating procedure; and
a cryptographic processing unit for receiving a plain text/cipher text data, for utilizing the central processing unit to conduct the conversion function by means of the bit expansion operation, the bitwise exclusive OR operation that uses the sub-key, the selection operations that use the at least one new substitution box generated by the substitution box generating unit, a plurality of the bitwise AND operations, and at least one bitwise OR operation.

16. The cryptographic apparatus for enhancing computation performance of a central processing unit as claimed in claim 15, wherein the bit permutation sequence complies with that of the permutation operation of the function (f) of a Data Encryption Standard (DES) algorithm and the conversion function produces the same result as that of the function (f) of a Data Encryption Standard (DES) algorithm.

17. The cryptographic apparatus for enhancing computation performance of a central processing unit as claimed in claim 15, wherein when the processing bit length of said central processing unit detected by said substitution box generating unit is 8 bits, said substitution box generating unit providing the at least one new substitution box that has new substitution values of 8 bits according to the processing bit length, and the new substitution values of each of the at least one new substitution box being the results of combining and then rearranging the substitution values of at least one original substitution box.

18. The cryptographic apparatus for enhancing computation performance of a central processing unit as claimed in claim 17, wherein the substitution values of each of the at least one new substitution box are obtained by: combining corresponding pairs of the original substitution boxes into combined substitution boxes; forming a 32-bit sequence from substitution values of the combined substitution boxes at correspondingly same locations in the combined substitution boxes; rearranging the 32-bit sequence according to the bit permutation sequence; and allocating the 32-bit sequence into four of the new substitution boxes, the bit length of each of the new substitution values being 8 bits.

19. The cryptographic apparatus for enhancing computation performance of a central processing unit as claimed in claim 18, wherein the 32-bit sequence is divided into four segments for processing by said central processing unit, each segment being 8 bits, and arrangement indices of bits in the segments being [16, 7, 20, 21, 29, 21, 28, 17], [1, 15, 23, 26, 5, 18, 31, 10], [2, 8, 24, 14, 32, 27, 3, 9] and [19, 13, 30, 6, 22, 11, 4, 25], respectively.

20. The cryptographic apparatus for enhancing computation performance of a central processing unit as claimed in claim 18, wherein each of the new substitution boxes has two sets of 8-bit outputs as the result of a corresponding selection operation, the 8-bit outputs respectively undergoing proper bitwise AND operations to obtain a desired bit data, the desired bit data producing the result of the conversion function after undergoing suitable bitwise OR operations.

21. The cryptographic apparatus for enhancing computation performance of a central processing unit as claimed in claim 15, wherein when the processing bit length of said central processing unit detected by said substitution box generating unit is 16 bits, said substitution box generating unit providing the at least one new substitution box that has new substitution values of 16 bits according to the processing bit length, and the new substitution values of each of the at least one new substitution box being the results of combining and then rearranging substitution values of at least one original substitution box.

22. The cryptographic apparatus for enhancing computation performance of a central processing unit as claimed in claim 21, wherein the substitution values of each of the at least one new substitution box are obtained by: combining corresponding pairs of the original substitution boxes into combined substitution boxes; forming a 32-bit sequence from substitution values of the combined substitution boxes at correspondingly same locations in the combined substitution boxes; rearranging the 32-bit sequence according to the bit permutation sequence; and allocating the 32-bit sequence into two of the new substitution boxes, the bit length of each of the new substitution values being 16 bits.

23. The cryptographic apparatus for enhancing computation performance of a central processing unit as claimed in claim 22, wherein the 32-bit sequence is divided into two segments for processing by said central processing unit, each segment being 16 bits, and arrangement indices of bits in the segments being [16, 7, 20, 21, 29, 12, 28, 17, 1, 15, 23, 26, 5, 18, 31, 10], and [2, 8, 24, 14, 32, 27, 3, 9, 19, 13, 30, 6, 22, 11, 4, 25], respectively.

24. The cryptographic apparatus for enhancing computation performance of a central processing unit as claimed in claim 22, wherein each of the new substitution boxes has four sets of 16-bit outputs as the results of a corresponding selection operation, the 16-bit outputs respectively undergoing proper bitwise AND operations to obtain a desired bit data, the desired bit data producing the result of the conversion function after undergoing suitable bitwise OR operations.

25. The cryptographic apparatus for enhancing computation performance of a central processing unit as claimed in claim 15, wherein when the processing bit length of said central processing unit detected by said substitution box generating unit is 32 bits, said substitution box generating unit providing the at least one new substitution box that has new substitution values of 32 bits according to the processing bit length, and the new substitution values of each of the at least one new substitution box being the results of combining and then rearranging substitution values of at least one original substitution box.

26. The cryptographic apparatus for enhancing computation performance of a central processing unit as claimed in claim 25, wherein the substitution values of each of the at least one new substitution box is obtained by: combining corresponding pairs of the original substitution boxes into combined substitution boxes; forming a 32-bit sequence from substitution values of the combined substitution boxes at correspondingly same locations in the combined substitution boxes; rearranging the 32-bit sequence according to the bit permutation sequence; and allocating the 32-bit sequence into the new substitution box, the bit length of each of the new substitution values being 32 bits.

27. The cryptographic apparatus for enhancing computation performance of a central processing unit as claimed in claim 26, wherein the 32-bit sequence is a single segment for processing by said central processing unit, and arrangement indices of bits in the segments are [16, 7, 20, 21, 29, 12, 28, 17, 1, 15, 23, 26, 5, 18, 31, 10, 2, 8, 24, 14, 32, 27, 3, 9, 19, 13, 30, 6, 22, 11, 4, 25].

28. The cryptographic apparatus for enhancing computation performance of a central processing unit as claimed in claim 26, wherein the new substitution box has eight sets of 32-bit outputs as the results of a corresponding selection operation, the 32-bit outputs respectively undergoing proper bitwise AND operations to obtain a desired bit data, the desired data producing the result of the conversion function after undergoing a bitwise OR operation.

* * * * *